United States Patent
Rafii et al.

(10) Patent No.: US 8,589,033 B2
(45) Date of Patent: Nov. 19, 2013

(54) CONTACTLESS OBSTACLE DETECTION FOR POWER DOORS AND THE LIKE

(75) Inventors: Abbas Rafii, Palo Alto, CA (US);
Richard New, Sunnyvale, CA (US);
Sunil Acharya, Palo Alto, CA (US);
Timothy Droz, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 1315 days.

(21) Appl. No.: 12/008,430

(22) Filed: Jan. 11, 2008

(65) Prior Publication Data
US 2011/0295469 A1  Dec. 1, 2011

Related U.S. Application Data

(60) Provisional application No. 60/879,963, filed on Jan. 11, 2007.

(51) Int. Cl.
*E05F 15/20* (2006.01)
*G01C 3/00* (2006.01)
*G05B 19/4061* (2006.01)
*B60J 5/00* (2006.01)

(52) U.S. Cl.
USPC ............... 701/49; 356/5.01; 49/26; 318/286; 318/466; 340/436

(58) Field of Classification Search
USPC .............. 701/49; 356/141.1, 4.01–5.15; 348/402.1, 313, 143; 49/26–28; 342/450; 318/280, 286, 362, 466; 340/435, 436
See application file for complete search history.

(56) References Cited

U.S. PATENT DOCUMENTS

| | | | | |
|---|---|---|---|---|
| 5,982,126 A * | 11/1999 | Hellinga et al. | ............... | 318/468 |
| 6,323,942 B1 * | 11/2001 | Bamji | ........................ | 356/5.01 |
| 6,344,642 B1 * | 2/2002 | Agam et al. | ................... | 250/221 |
| 6,515,740 B2 * | 2/2003 | Bamji et al. | ............... | 356/141.1 |
| 6,580,496 B2 * | 6/2003 | Bamji et al. | ................... | 356/5.1 |
| 6,970,085 B2 * | 11/2005 | Okabe et al. | ................. | 340/545.6 |
| 7,175,227 B2 * | 2/2007 | Menard | ..................... | 296/146.4 |
| 7,298,247 B2 * | 11/2007 | Shimizu | ........................ | 340/435 |
| 7,405,812 B1 * | 7/2008 | Bamji | ........................... | 356/5.1 |
| 7,408,627 B2 * | 8/2008 | Bamji et al. | ................... | 356/5.01 |
| 7,471,376 B2 * | 12/2008 | Bamji et al. | ................... | 356/5.01 |
| 7,636,150 B1 * | 12/2009 | McCauley et al. | ........... | 356/5.01 |
| 7,719,662 B2 * | 5/2010 | Bamji et al. | ................... | 356/5.1 |
| 7,733,043 B2 * | 6/2010 | Casella et al. | ................ | 318/280 |
| 7,741,961 B1 * | 6/2010 | Rafii et al. | ..................... | 340/435 |

(Continued)

*Primary Examiner* — Joseph Rocca
*Assistant Examiner* — George Spisich
(74) *Attorney, Agent, or Firm* — Vierra Magen Marcus LLP

(57) ABSTRACT

Time-of-flight (TOF) three-dimensional sensing systems are deployed on or in a motor vehicle to image contact zones associated with potential contact between an avoidable object and the vehicle or vehicle frame and/or remotely controllable motorized moving door or liftgate. An algorithm processes depth data acquired by each TOF system to determine whether an avoidable object is in the associated contact zone. If present, a control signal issues to halt or reverse the mechanism moving the door. A stored database preferably includes a depth image of the contact zone absent any object, an image of the door, and volume of the door. Database images are compared to newly acquired depth images to identify pixel sensors whose depth values are statistically unlikely to represent background or the door. Pixels within the contact zone so identified are an object, and the control signal is issued.

19 Claims, 8 Drawing Sheets

(56) References Cited

U.S. PATENT DOCUMENTS

| | | | |
|---|---|---|---|
| 2001/0042989 A1* | 11/2001 | Greif | 296/50 |
| 2002/0036259 A1* | 3/2002 | Agam et al. | 250/221 |
| 2006/0176467 A1* | 8/2006 | Rafii et al. | 356/4.07 |
| 2007/0008124 A1* | 1/2007 | Stadler et al. | 340/545.1 |
| 2008/0028682 A1* | 2/2008 | Casella et al. | 49/25 |
| 2009/0007489 A1* | 1/2009 | Kern et al. | 49/31 |

* cited by examiner

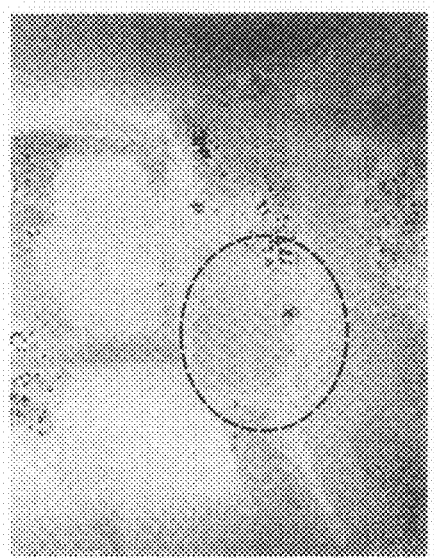
FIG. 6A  FIG. 6B
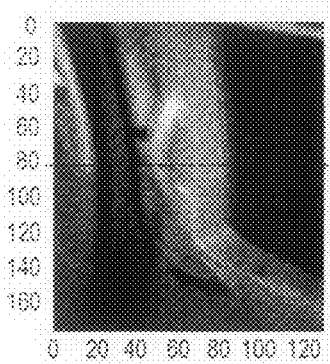
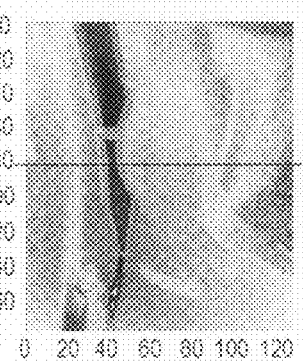
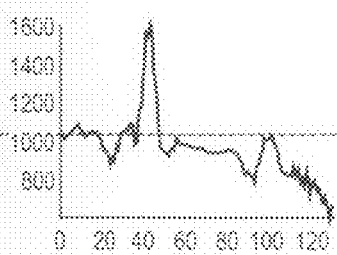
FIG. 6C  FIG. 6D  FIG. 6E

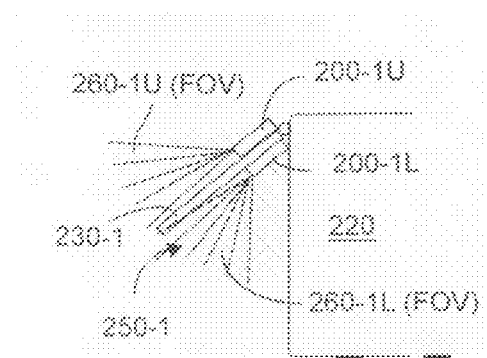
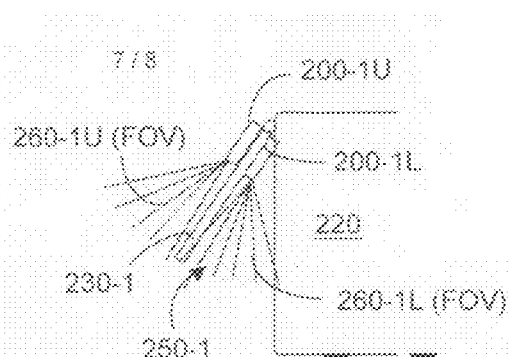
FIG. 7A  FIG. 7B
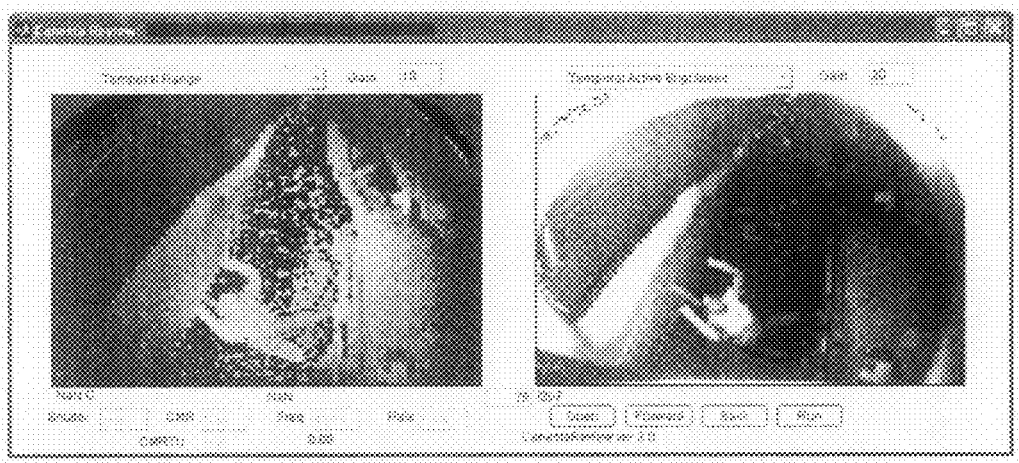
FIG. 8A  FIG. 8B
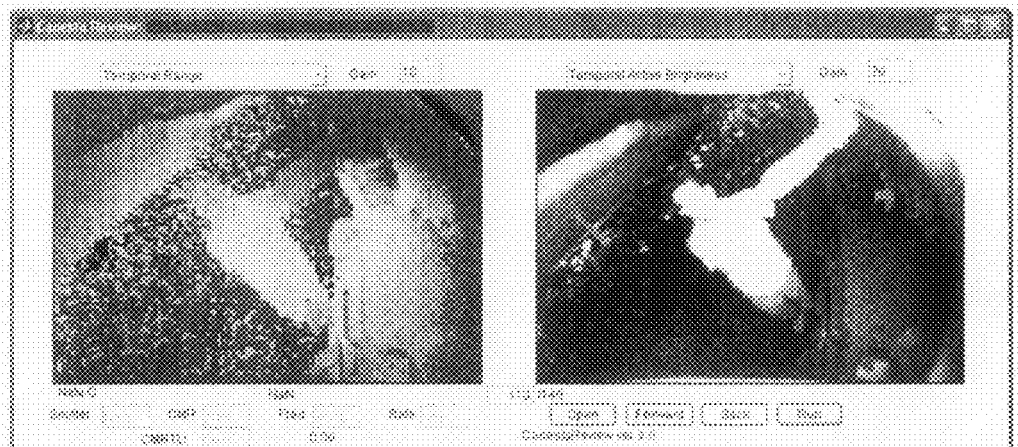
FIG. 8C  FIG. 8D

CONTACTLESS OBSTACLE DETECTION FOR POWER DOORS AND THE LIKE

RELATION TO CO-PENDING APPLICATION

Priority is claimed to U.S. Provisional patent application Ser. No. 60/879,963 filed 11Jan. 2007, and assigned to Canesta, Inc. of Sunnyvale, Calif., assignee herein.

FIELD OF THE INVENTION

The present invention relates generally to mechanisms to prevent damage from unintended contact between objects and remotely controllable movable mechanisms such as powered doors, powered liftgates, and the like, and more particularly to contactless mechanisms to prevent such contact between objects and remotely powered slideable side doors and pivotable liftgates on motor vehicles, and automatic doors and gates in buildings and elevators.

BACKGROUND OF THE INVENTION

Many modern motor vehicles including vans, minivans, SUVs, etc. have sliding side doors and sometimes rear liftgates or hatch-back doors as well. As used herein, the term "door" is understood to collectively encompass slideable doors, pivotable liftgates, pivotable tailgates, and pivotable hatchbacks. When closed, these doors fit against a vehicle door frame. These doors can be rather heavy and develop inertia as they move. As such, should an object be caught between a closing door and the vehicle door frame, damage can occur to the object (which may be a person), to the door and/or to the vehicle door frame. While opening, many side doors first move outward, away from the vehicle body, before moving rearward, and can cause damage to an object thus contacted. A liftgate, tailgate, or hatchback can strike an object while opening or closing, even if an object is not close to the associated vehicle door frame. As used herein, the term "contact zone" is understood to refer to region or zone of interest in which an object may be contacted by a moving door. As such, the contact zone includes the path and/or trajectory of the moving door. In some embodiments, the contact zone is defined relative to the position of the door and thus moves as the door moves, and indeed, in some embodiments the dimensions of the contact zone may vary with at least one door parameter, for example, present door position and present door velocity.

In many vehicles, doors are opened or closed using motors controlled by the vehicle operator from a remote location, e.g., the driver's seat. A practical problem is that the vehicle operator cannot always see what if any object(s) are in the contact zone. As a result, damage to the object and/or door and/or associated vehicle door frame can occur before meaningful remedial action can be taken, e.g., to reverse or halt movement of the door.

In an attempt to reduce likelihood of damage from contact between a moving vehicle door and an object, the federal government has mandated Federal Motor Vehicle Safety Standard 118. This standard calls for implementation of so-called anti-pinch devices that sense contact when an object is between a closing vehicle door and the associated vehicle door frame. Some anti-pinch devices are contact devices that require physical contact with an object and the vehicle door and/or door frame, whereas other anti-pinch devise are contactless, and do not require such contact.

Contact type anti-pinch devices try to mitigate damage after initial contact between an object and the vehicle door and/or door frame occurs. As soon as contact is detected, a control signal is generated causing the motor moving the door to halt or to reverse direction. Some contact sensors dispose a tube or trim within the relevant vehicle door frame region, and then sense at least one contact-caused parameter such as pressure, capacitance change, optical change, electrical current increase in the door drive motor, etc. The tube or trim may contain spaced-apart electrical wires that make contact only if an object depresses the tube or trim. In practice, such sensors are sometimes difficult to install, and can exhibit varying contact responses, especially as ambient temperature changes. But even if the best contact type anti-pinch device can only begin to function after some physical contact with an object has first occurred. Thus, a corrective command signal is not issued until initial contact occurs. In some instances, corrective action may come too late. For example, upon detecting contact there may be insufficient time to fully halt the closing action of a sliding door on a vehicle parked on a steep downhill incline. An object, which may be a person's hand, could be severely damaged before the closing inertia of the sliding door can be halted.

By contrast, an ideal contactless anti-pinch device would prevent contact damage by detecting the presence of an object within a contact zone and taking immediate corrective action without first requiring initial contact.

Various attempts have been made in the prior art to implement a contactless anti-pinch device, at least with respect to a human object. One such approach seeks to detect microampere range electrical current changes resulting from capacitance in the skin of a human object. Electrical sensors disposed in regions of the vehicle door frame and/or door allegedly can thus contactlessly sense the presence of human objects by such capacitance and/or current changes. Whether such sensors can detect human proximity to a closing door under varying ambient parameters is unknown to applicants. But even if such devices worked flawlessly, and there is no evidence such is the case, passive objects such as tree limbs, other vehicles, or non-exposed human skin such as gloved hands, do not manifest skin capacitance responsive to current (or voltage) change, and thus would go undetected.

In theory, other approaches to contactless sensing might include use of conventional television-type cameras to image the contact zones. However in practice, the images produced by such cameras lack useful depth information and would not adequately identify objects in the contact zone such that remedial action could be undertaken. Approaches such as attempting to identify human objects in the contact zone using infrared (IR) sensors would similarly not work well, especially at high ambient temperatures. Further, such IR sensing would be of little use as to objects that did not generate heat. Object sensing using ultra sound would lack adequate resolution and spatial coverage.

A more promising technology for contactless sensing is true three-dimensional cameras that can form a Z or depth image of an object. Canesta, Inc., of Sunnyvale, Calif., assignee herein, has developed various time-of-flight (TOF) systems. Various aspects of TOF imaging systems are described in the following patents assigned to Canesta, Inc.: U.S. Pat. No. 6,323,942 entitled "CMOS-Compatible Three-Dimensional Image Sensor IC", U.S. Pat. No. 7,203,356 "Subject Segmentation and Tracking Using 3D Sensing Technology for Video Compression in Multimedia Applications", U.S. Pat. No. 6,906,793 Methods and Devices for Charge Management for Three-Dimensional Sensing", and U.S. Pat. No. 6,580,496 "Systems for CMOS-Compatible Three-Dimensional Image Sensing Using Quantum Efficiency Modulation", U.S. Pat. No. 6,515,740 "Methods for CMOS-Compatible Three-Dimensional image Sensing Using Quantum Efficiency Modulation". Applicants refer to and incorporate herein by reference the above-enumerated patents for background material.

FIG. 1 depicts an exemplary TOF system, as described in Canesta U.S. Pat. No. 6,323,942. TOF system 10 can be implemented on a single IC 110, without moving parts, preferably with relatively few off-chip components. System 100 includes a two-dimensional array 130 of Z pixel detectors 140, each of which has dedicated circuitry 150 for processing detection charge output by the associated detector. In a typical application, array 130 might include 100×100 pixels 140, and thus include 100×100 processing circuits 150. IC 110 preferably also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations, which may be output as DATA.

Under control of microprocessor 160, a source of optical energy 120, typical IR or NIR wavelengths, is periodically energized and emits optical energy $S_1$ via lens 125 toward an object 20. Typically the optical energy is light, for example emitted by a laser diode or LED device 120. Some of the emitted optical energy will be reflected off the surface of target object 20 as reflected energy $S_2$. This reflected energy passes through an aperture field stop and lens, collectively 135, and will fall upon two-dimensional array 130 of pixel detectors 140 where a depth or Z image is formed. In some implementations, each imaging pixel detector 140 captures time-of-flight (TOF) required for optical energy transmitted by emitter 120 to reach target object 20 and be reflected back for detection by two-dimensional sensor array 130. Using this TOF information, distances Z can be determined as part of the DATA signal that can be output elsewhere, as needed.

Emitted optical energy $S_1$ traversing to more distant surface regions of target object 20, e.g., Z3, before being reflected back toward system 100 will define a longer time-of-flight than radiation falling upon and being reflected from a nearer surface portion of the target object (or a closer target object), e.g., at distance Z1. For example the time-of-flight for optical energy to traverse the roundtrip path noted at t1 is given by t1=2·Z1/C, where C is velocity of light. TOF sensor system 10 can acquire three-dimensional images of a target object in real time, simultaneously acquiring both luminosity data (e.g., signal brightness amplitude) and true TOF distance (Z) measurements of a target object or scene.

Many Canesta, Inc. systems determine TOF and construct a depth image by examining relative phase shift between the transmitted light signals $S_1$ having a known phase, and signals $S_2$ reflected from the target object. Exemplary such phase-type TOF systems are described in several U.S. patents assigned to Canesta, Inc., assignee herein, including U.S. Pat. No. 6,515,740 "Methods for CMOS-Compatible Three-Dimensional Imaging Sensing Using Quantum Efficiency Modulation", U.S. Pat. No. 6,906,793 entitled Methods and Devices for Charge Management for Three Dimensional Sensing, U.S. Pat. No. 6,678,039 "Method and System to Enhance Dynamic Range Conversion Useable With CMOS Three-Dimensional Imaging", U.S. Pat. No. 6,587,186 "CMOS-Compatible Three-Dimensional Image Sensing Using Reduced Peak Energy", and U.S. Pat. No. 6,580,496 "Systems for CMOS-Compatible Three-Dimensional Image Sensing Using Quantum Efficiency Modulation". Applicants refer to and incorporate hereby by reference these above-enumerated patents for further background material.

FIG. 2A is based upon above-noted U.S. Pat. No. 6,906,793 and depicts an exemplary phase-type TOF system in which phase shift between emitted and detected signals, respectively, $S_1$ and $S_2$ provides a measure of distance Z to target object 20. Under control of microprocessor 160, optical energy source 120 is periodically energized by an exciter 115, and emits output modulated optical energy $S_1 = S_{out} = \cos(\omega t)$ having a known phase towards object 20. Emitter 120 preferably is at least one LED or laser diode(s) emitting low power (e.g., perhaps 1 W) periodic waveform, producing optical energy emissions of known frequency (perhaps a few dozen MHz) for a time period known as the shutter time (perhaps 10 ms).

Some of the emitted optical energy (denoted $S_{out}$) will be reflected (denoted $S_2 = S_{in}$) off the surface of target object 20, and will pass through aperture field stop and lens, collectively 135, and will fall upon two-dimensional array 130 of pixel or photodetectors 140. When reflected optical energy $S_{in}$ impinges upon photodetectors 140 in array 130, photons within the photodetectors are released, and converted into tiny amounts of detection current. For ease of explanation, incoming optical energy may be modeled as $S_{in} = A \cdot \cos(\omega \cdot t + \theta)$, where A is a brightness or intensity coefficient, $\omega \cdot t$ represents the periodic modulation frequency, and $\theta$ is phase shift. Thus, array 130 captures frames of Z depth and brightness data, typically at a frame rate of perhaps 30 to 60 frames/second. While the scene and object within are imaged with the same modulated optical energy $S_{out}$, each pixel detector 140 in array 130 will receive an object-reflected signal with a different delay ($\theta$) that corresponds to the varying z depth of the surface of the imaged object within the system field of view (FOV).

As distance Z changes, phase shift $\theta$ changes, and FIGS. 2B and 2C depict a phase shift $\theta$ between emitted and detected signals, $S_1$, $S_2$. The phase shift $\theta$ data can be processed to yield desired Z depth information. Within array 130, pixel detection current can be integrated to accumulate a meaningful detection signal, used to form a depth image. In this fashion, TOF system 100 can capture and provide Z depth information at each pixel detector 140 in sensor array 130 for each frame of acquired data. In some systems, pixel detection information is captured at at least two discrete phases, preferably 0° and 90°, and is processed to yield Z data. System 100 yields a phase shift $\theta$ at distance Z due to time-of-flight given by $\theta = 2 \cdot \omega \cdot Z/C = 2 \cdot (2 \cdot \pi \quad f) \cdot Z/C$, where C is the speed of light, 300,000 Km/sec. From the above equation, it follows that distance Z is given by $Z = \theta \cdot C/2 \cdot \omega = \theta \cdot C/(2 \cdot 2 \cdot f \cdot \pi)$. When $\theta = 2 \cdot \pi$, the aliasing interval range associated with modulation frequency f is given as $Z = C/(2 \cdot f)$. In practice, changes in Z produce change in phase shift $\theta$ although eventually the phase shift begins to repeat, e.g., $\theta = \theta + 2 \cdot \pi$, etc. Thus, distance Z is known modulo $2 \cdot \pi \cdot C/2 \cdot \omega) = C/2 \cdot f$, where f is the modulation frequency.

What is needed is a contactless anti-pinch method and system for use with motor vehicles that can identify an object in the contact zone in adequate time to take remedial action to mitigate against physical contact between the object and the vehicle door or door frame. Preferably the method and system should be operable under widely varying conditions such as changes in ambient lighting. Indeed, ideally the method and system should operate even in the absence of ambient light. Finally, the method and system should be economically mass producible and readily installable.

The present invention provides such protective mechanisms and methods to detect objects in the contact zone or trajectory path of remotely controllably power doors.

SUMMARY OF THE INVENTION

Embodiments of the present invention provide anti-pinch protection for a motor vehicle using at least one time of flight (TOF) three-dimensional sensing system and associated software to detect presence of potential obstacles or objects in contact zones associated with remotely powered vehicle doors. If an object to be avoided is within a contact zone, the avoidable object is at risk for contact with the door, and/or vehicle door frame. By contrast, an object within the contact zone that may be part of the vehicle need not necessarily be avoided, e.g., the vehicle door frame, a portion of the door itself. The preferably CMOS-implementable TOF sensing systems are disposed on the vehicle door frame and/or doors such that the sensing fields of view (FOV) encompass the opening or closing trajectories of the associated doors, e.g., sliding doors, tailgates, liftgates.

A memory, that may be part of the TOF memory, preferably stores a database that includes a depth image of the relevant contact zone with no object within the zone. Preferably the database also includes a depth image of the relevant door, and the volume of the door, where "volume" is the three-dimensional volume of the physical door as well as the volume of space traversed by the door as it moves during opening and closing. As the TOF system acquires three-dimension Z or depth images, these images are compared to the stored database information.

The database information can be related to fixed parts of the door or door frame, so that these structures are not considered as obstacles to be avoided. If desired, the database information may be heuristic. Thus heuristics may be used to simplify contents of the stored database, and the processing of such contents. The contact zone may also define a back clipping plane of the FOV, beyond which obstacles should be ignored with respect to contact avoidance. For instance, in a liftgate application, the back clipping plane of the contact zone may be defined as a few inches beyond the length of the liftgate The image comparison involves identifying pixel sensors in the sensor array whose Z depth values are statistically unlikely to represent background or the door or door frame structure itself. This comparison enables an algorithm to rapidly determine whether an object, e.g., an avoidable object, is within the relevant contact zone. If the object is determined to be within the relevant contact zone, a control signal is generated that can cause the motor or other mechanism moving the relevant door to retard movement, to halt movement or to reverse direction of the movement. If no obstacle is determined to be within the relevant contact zone, additional depth images are acquired as the door continues to move. In this manner, the present invention implements anti-pinch protection that does not require some initial contact between an object and the door frame and/or door to be invoked.

Other features and advantages of the invention will appear from the following description in which the preferred embodiments have been set forth in detail, in conjunction with the accompany drawings.

BRIEF DESCRIPTION OF THE DRAWINGS

FIG. 6A is a gray scale depth image depicting a contact zone region model devoid of any object, according to an embodiment of the present invention;

FIG. 6B is a gray scale depth image depicting the same contact zone region shown in FIG. 6A but depicting a cluster of Z depth values that differ sufficiently from what is shown in FIG. 6A to denote presence of an object in the contact zone, according to an embodiment of the present invention;

FIG. 6C depicts a brightness image of a region of a contact zone, according to an embodiment of the present image;

FIG. 6D is a gray scale depth image of the same region of the contact zone depicted in FIG. 6C, according to an embodiment of the present invention;

FIG. 6E is depth data acquired across a single row in the array of pixel depth detectors clearly depicting a substantial deviation in depth value that is consistent with presence of an object in the contact zone, according to an embodiment of the present invention;

FIGS. 7A and 7B depict affixing at least one TOF system to a moveable door, and the dynamic contact zones associated therewith, according to an embodiment of the present invention;

FIGS. 8A and 8B depict, respectively, a gray scale depth image and a brightness image acquired of a liftgate by a stationary vehicle-mounted TOF system when an object is imaged, according to an embodiment of the present invention;

FIGS. 8C and 8D depict, respectively, a gray scale depth image and a brightness image acquired of a liftgate by a stationary vehicle-mounted TOF system when an object is imaged within the associated contact zone, according to an embodiment of the present invention;

DETAILED DESCRIPTION OF THE PREFERRED EMBODIMENTS

Figure 1A:
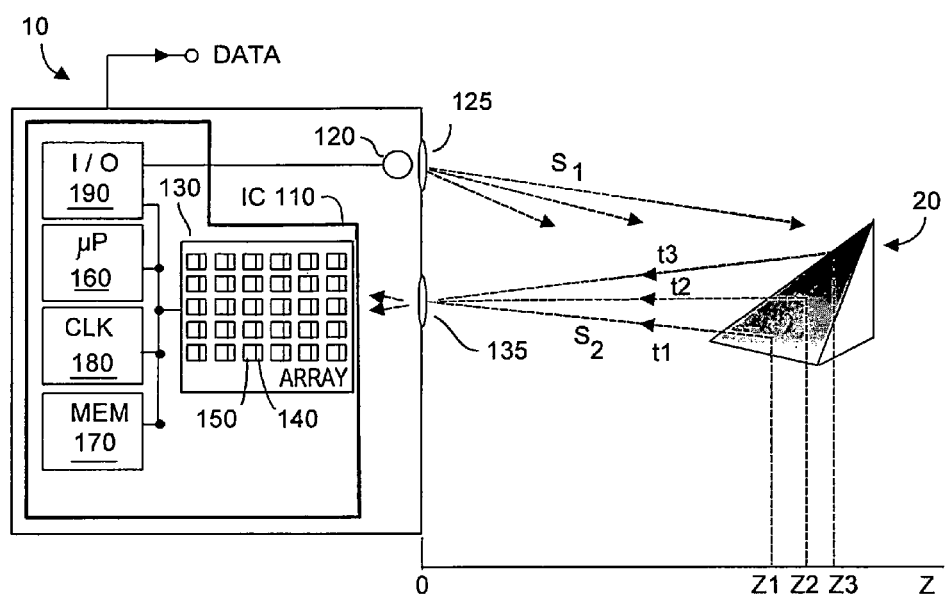
FIG. 1 depicts a time-of-flight (TOF) range finding system, according to the prior art.
Figure 2A:
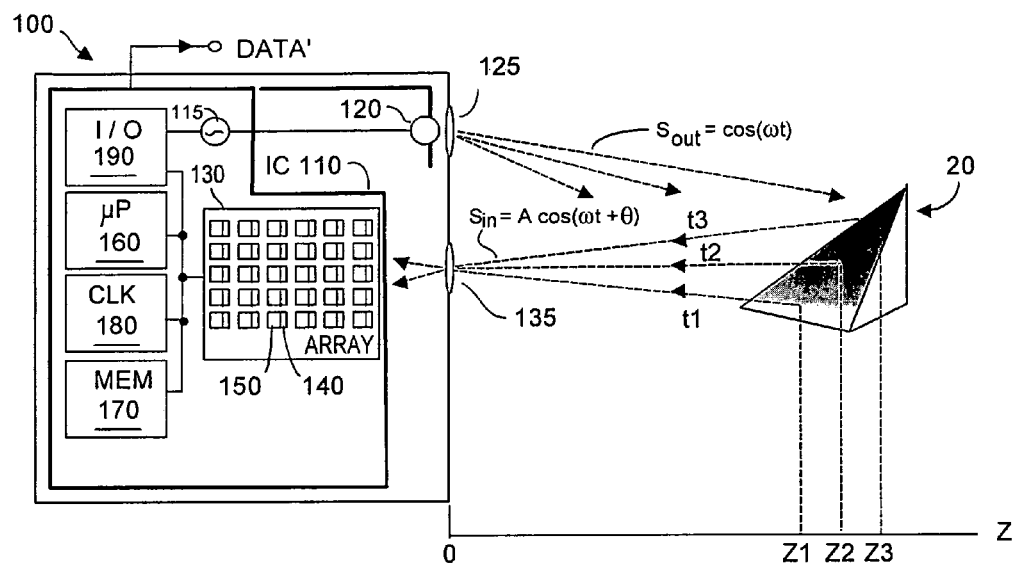
FIG. 2A depicts a phase-based TOF range finding system whose Z-pixels exhibit additive signal properties, according to the prior art.
Figure 2B:
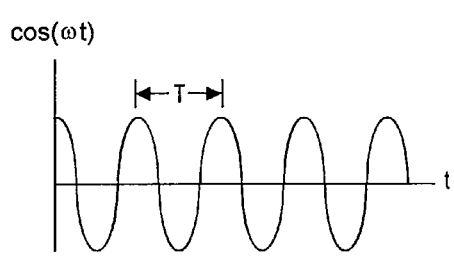
FIGS. 2B and 2C depict phase-shifted signals associated with the TOF range finding system of FIG. 2A, according to the prior art.
Figure 2C:
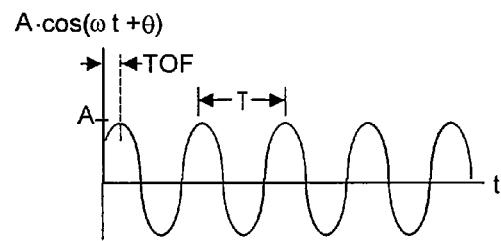
Figure 3:
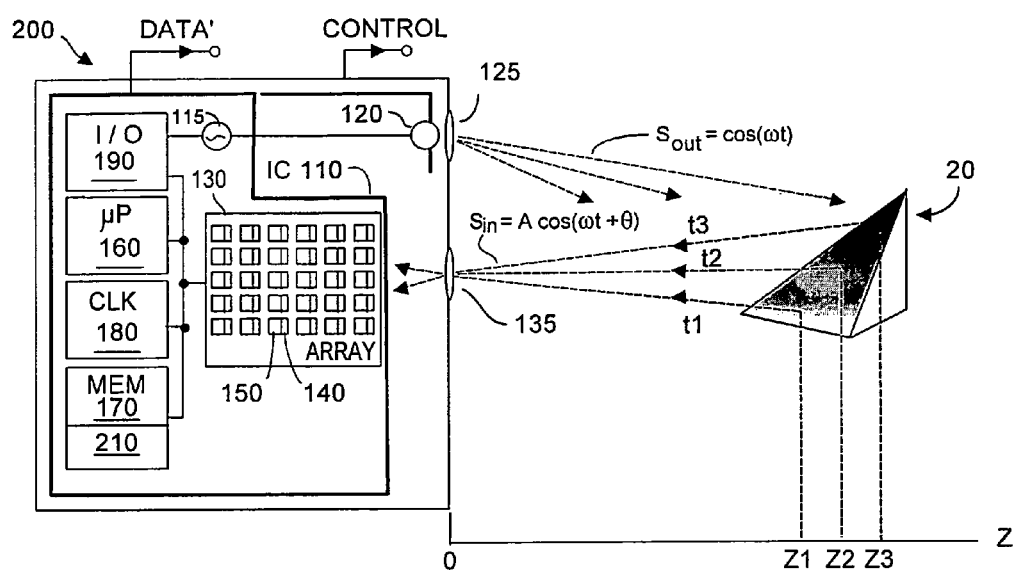
FIG. 3 depicts a phase-based TOF system used to implement contactless obstacle sensing, according to embodiments of the present invention.

FIG. 3 depicts a TOF system 200 used to implement contactless obstacle sensing, according to embodiments of the present invention. Preferably system 200 is phase-based, and elements shown in FIG. 3 bearing reference numerals identical to those shown for FIG. 2A may be considered to be similar if not identical elements. However memory 170 in system 200 preferably stores at least one software algorithm routine 210 that upon execution, e.g., by processor 160 or other processing resource, carries out embodiments of the present invention.

Preferably system 200 is CMOS-compatible and can be mass produced economically for perhaps $100 per system in quantity. System 200 preferably consumes relatively low operating power, perhaps 12 W, from the electrical system of the motor vehicle with which it is used. Emitter 120 preferably comprises several parallel-coupled diffused LED devices outputting perhaps 1W to 2W of optical energy in the 850 nm to 870 nm wavelength range, with exemplary modulation frequency of perhaps 32 MHz to 44 MHz and a duty cycle of perhaps 50%. A modulation frequency in this relatively high range provides adequate spatial resolution needed to image and identify objects within the imaging field of view *FOV). Preferably array 130 comprises perhaps 132 rows and 176 columns or 120 rows and 160 columns of differentially operated pixel sensors 140, although other array densities and pixel sensors could of course be used. Preferably the imaging FOV for system 200 is about 148° (measured diagonally), if not wider. It is to be understood that the above-cited information and values are exemplary and that system 200 could in fact be implemented with different specifications.

As noted, $Z=C\Delta T/2$ and in an ideal system, one could use simple geometry to convert $\Delta T$ directly to radial distances Z, and then to (X,Y,Z) coordinates in space, e.g., a relevant contact zone. But TOF system 200 is fabricated from real rather than ideal components, and there exists pixel-to-pixel variations in gate timing, imperfect square wave signals $S_{out}$, imperfect distribution of optical energy from emitter 120, imperfect lenses 125, 135, etc. Accordingly, a per-pixel calibration function is preferably used to map between measured $\Delta T$ values to Z values, where the calibration function may be determined empirically or analytically. In addition, a calibration function preferably is used to map from each pixel (row, column) location within array 130 to a three-dimensional direction ray (X/Z,Y/Z,1), which function may be obtained by imaging a grid pattern of known dimensions. Vector scaling by the measured Z yields the desired three-dimensional coordinates within the contact zone. Thus, it is understood that in FIG. 3, TOF system 200 generates DATA' that includes a collection (or "cloud") of data points with accurate X,Y,Z position information in an absolute sense with respect to the system, e.g., DATA' provides real-world distances with respect to system 200.

It is desired that each system 200 disposed in a motor vehicle operate to prevent damage from contact between an object and the vehicle door frame or moving door. Accordingly, reliable operation of TOF systems 200 in a vehicle (or in conjunction with a building, elevator, etc.) requires that Z or depth images be acquired without ambiguity as to depth values, and that system 200 functions even in the presence of strong ambient light, e.g., sunlight.

With respect to depth ambiguity, it has been noted that three-dimensional TOF system 200 can determine distance Z to an object, modulo $c/2 \cdot f$. However the imaged FOV may encompass distances exceeding the non-ambiguous range $Z=c/2f$ and accordingly, embodiments of the present invention preferably employ some form of dealiasing. Dealiasing can include acquiring depth images using difference frequencies f, e.g., $f_1$ and $f_2$. The distance Z to an object is constant within the short time interval during which depth images using frequencies $f_1$ and $f_2$ are acquired. Thus the time T to the object can be uniquely determined since in general only one value of time will be consistent with the two sets of acquired depth data. Once the T is determined, distance Z to the object can be determined. Various techniques to achieve dealiasing may be implemented and further details will not be presented.

Although system 200 preferably emits and detects optical energy in the IR or near IR (NIR) range, it is nonetheless important that sensors 140 in array 130 not be overwhelmed with excessively high magnitudes of visible ambient light, e.g., sunlight. Accordingly, pixel sensors 140 in array 130 should function over a high dynamic range, and should be substantially immune to high magnitudes of common noise signal components (e.g., ambient light). As described in U.S. Pat. Nos. 6,515,740 and 6,906,793, system 200 preferably employs a form of synchronous optical energy emission and optical energy detection. Preferably modulator unit 115 drives emitter 120 with a modulation signal having an active phase and an inactive phase. The pixel detectors preferably are reset at start of each frame of data acquisition, before integrating incoming optical energy. Each pixel detector or sensor produces a detection signal proportional to magnitude of the detected charge and the integration duration time. Using so-called quantum efficiency modulation (QEM), active and inactive phase durations and associated detection amplification gains preferably are selected to cause system gain to average to zero for ambient light when $S_{in}$ signals are integrated over a predetermined measurement period. Preferably the synchronously detected signal is subtracted from a predetermined offset value, and the difference is integrated over the measurement period and compared to a predetermined threshold value. The preferably differential detection system is periodically reset before this threshold value is exceeded. While ambient light theoretically does not affect differential detection, excessive ambient light could saturate the detection system. Thus it is preferred that a common mode reset (CMR) operation be carried out periodically, perhaps thousands of times per second. This CMR reset protects the differential sensors from high ambient light (e.g., common mode) signals, while preserving the desired differential detection signal components. Successfully recovering a unique value of $\Delta T$ and thus Z preferably involves repeating sensor measurements are multiple detector clock phases, e.g., 0°, 90°, 180°, and 270°. These four measurements may be acquired from the same pixel detector over four adjacent frames, assuming object depth varies slowly over time, or within a single frame using four adjacent pixel detectors, assuming object depth varies slowly over space. Overall, signal detection within system 200 is characterized by good signal dynamic range and common mode rejection, as well as good signal/noise. Thus system 200 can function even if strong ambient light is present.

Figure 4A:
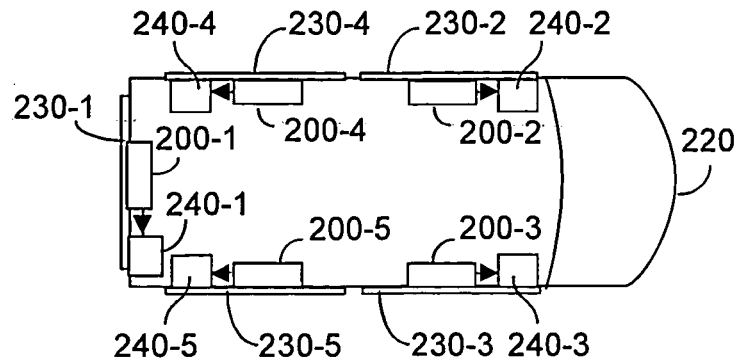
FIG. 4A is an X-ray plan view depicting TOF systems such as shown in FIG. 3A disposed to monitor various contact zones associated with a motor vehicle, according to embodiments of the present invention.

Having generally described suitable generic TOF systems 200, FIG. 4A is a plan X-ray view showing several such TOF systems 200 disposed at various locations in or on a motor vehicle 220 to monitor respective contact zones. For example, in FIG. 4A, vehicle 220 has a rear liftgate (or tailgate) 230-1 that is monitored by TOF system 200-1, whose output signal can cause opening-closing motor mechanism or the like 240-1 to retard, to halt, or to reverse motion of the liftgate. Vehicle 220 also has left and right front sliding doors, 230-2, 230-3, with their associated TOF systems 200-2, 200-3, and TOF system controlled mechanisms 240-2, 240-3. Finally, vehicle 220 has left and right rear sliding doors 230-4, 230-5, with their associated TOF systems 200-4, 200-5, and TOF system controlled mechanisms 240-4, 240-4. It should be understood that the contact zone associated with a given door may in fact be protected by more than one associated TOF system, and that in general a TOF system may be mounted on the vehicle frame, or on the door itself. Alternatively, in some vehicles it may not be necessary to protect every contact zone. The various opening-closing mechanisms 240-x may also be controlled by the output signal from any prior art anti-pinch devices that may also be present (not shown). It is noted that motor vehicle 220 is depicted as having remotely operable powered front sliding doors 200-2, 200-3, whereas most vehicles have hinged front doors. Thus, it should be understood that FIGS. 4A-4C are intended to be guidelines with respect to protecting against object-front door contact, according to the present invention.

Figure 4B:
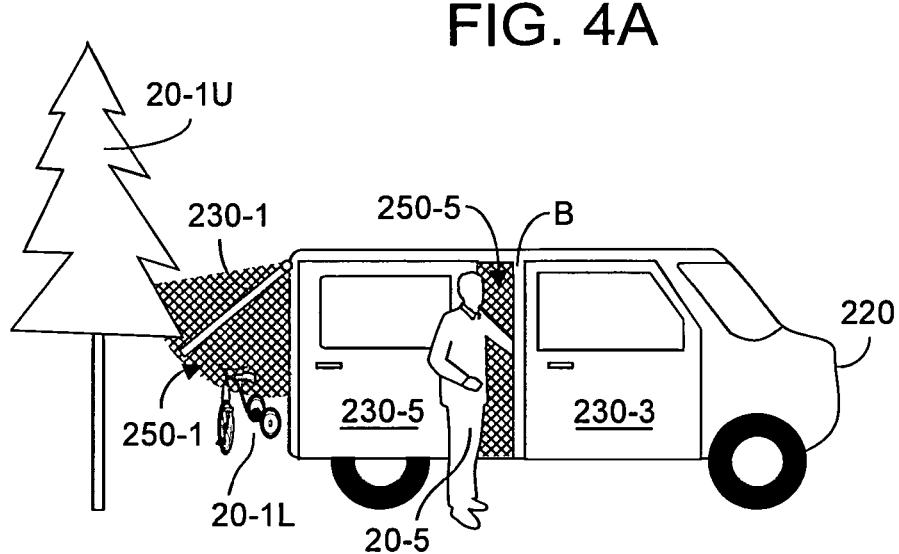
FIG. 4B is a side view of the motor vehicle of FIG. 4A depicting exemplary contact zones and objects, according to embodiments of the present invention.

FIG. 4B is a sideview of vehicle 220 (see FIG. 4A) with right rear door 230-5 depicted in the act of closing, e.g., sliding forward, towards an object 20-5, namely the left arm of a person. Shown in cross-hatch in the gap between the front of this door and the vehicle door frame is a contact zone 250-5 that is encompassed within the FOV 260-5. As shown in FIG. 4C. FOV 260-5 is associated with TOF system 200-5, the TOF system responsible for monitoring this contact zone. It is the function of TOF system 200-5 to detect the presence of objects, e.g., 20-5 in contact zone 250-5 before any object-door contact occurs. If an object is detected in this contact zone, TOF system 200-5 will generate a control signal to cause door moving mechanism 240-5 to retard, to halt, or to reverse movement of door 230-5. In a similar fashion, TOF system 200-4 monitors the contact zone associated with left rear door 230-4. If an object is detected within the contact zone associated with door 230-4, TOF system 200-4 will generate a control signal to cause mechanism 240-4 to retard, to halt, or to reverse door movement.

Figure 4C:
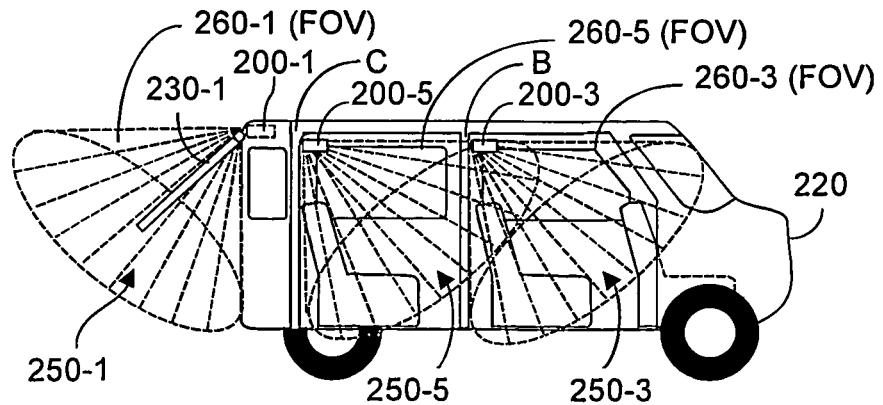
FIG. 4C is a side view of the motor vehicle of FIG. 4B with the right side doors removed depicting relative fields of view for exemplary TOF systems according to embodiments of the present invention.

If vehicle 220 includes sliding (as opposed to hinge-mounted) front doors, FIG. 4C depicts exemplary TOF system 200-3 with associated FOV 260-3 encompassing contact zone 250-3. If an object is detected within the contact zone associated with front door 200-3, TOF system 200-3 will generate a control signal to cause mechanism 240-3 to retard, to halt, or to reverse door movement. In similar fashion, TOF system 200-2 can be provided to guard against object contact with left front door 230-2.

FIG. 4B depicts liftgate 230-1 being deployed and depicts in cross-hatch contact zone 250-1 encompassed within FOV 260-1 associated with associated TOF system 200-1. Object 20-1U is depicted above the present position of liftgate 230-1, and an object 20-1L below the present position of liftgate 230-1. It is understood that if liftgate 230-1 is opening, there is potential of contact with overhanging tree object 20-1U, and that if liftgate 230-1 is closing, there is potential of contacting tricycle object 20-1L. It is the function of TOF system 200-1 to detect the presence of objects such as 20-1U, 20-1L within contact zone 250-1 before any object-liftgate contact occurs. According to embodiments of the present invention, as soon as an object is determined to be within the relevant contact zone, the associated TOF system issues a control command signal that can cause associate door moving mechanisms such as 240-1, 240-3 to retard, to halt, or to reverse motion of the associated door.

According to embodiments of the present invention, each protected door is associated with a contact zone that is covered by at least one TOF system whose three-dimensional FOV is adequately wide to image and detect an object potentially within the contact zone. Ideally, the FOV of each TOF system 200 approximates a three-dimensional cone. In practice a FOV encompassing about 148° measured diagonally provides sufficient imaging coverage, although preferably a wider FOV, perhaps about 160°, would provide even wider coverage. For reasons of economy, it is preferred that each TOF system 200 be stationary. However one could instead deploy some or all TOF systems 200 on a mechanically rotatable platform. Such mechanical rotation would enable a greater FOV to be imaged, thus protecting a wider contact zone.

Figure 5:
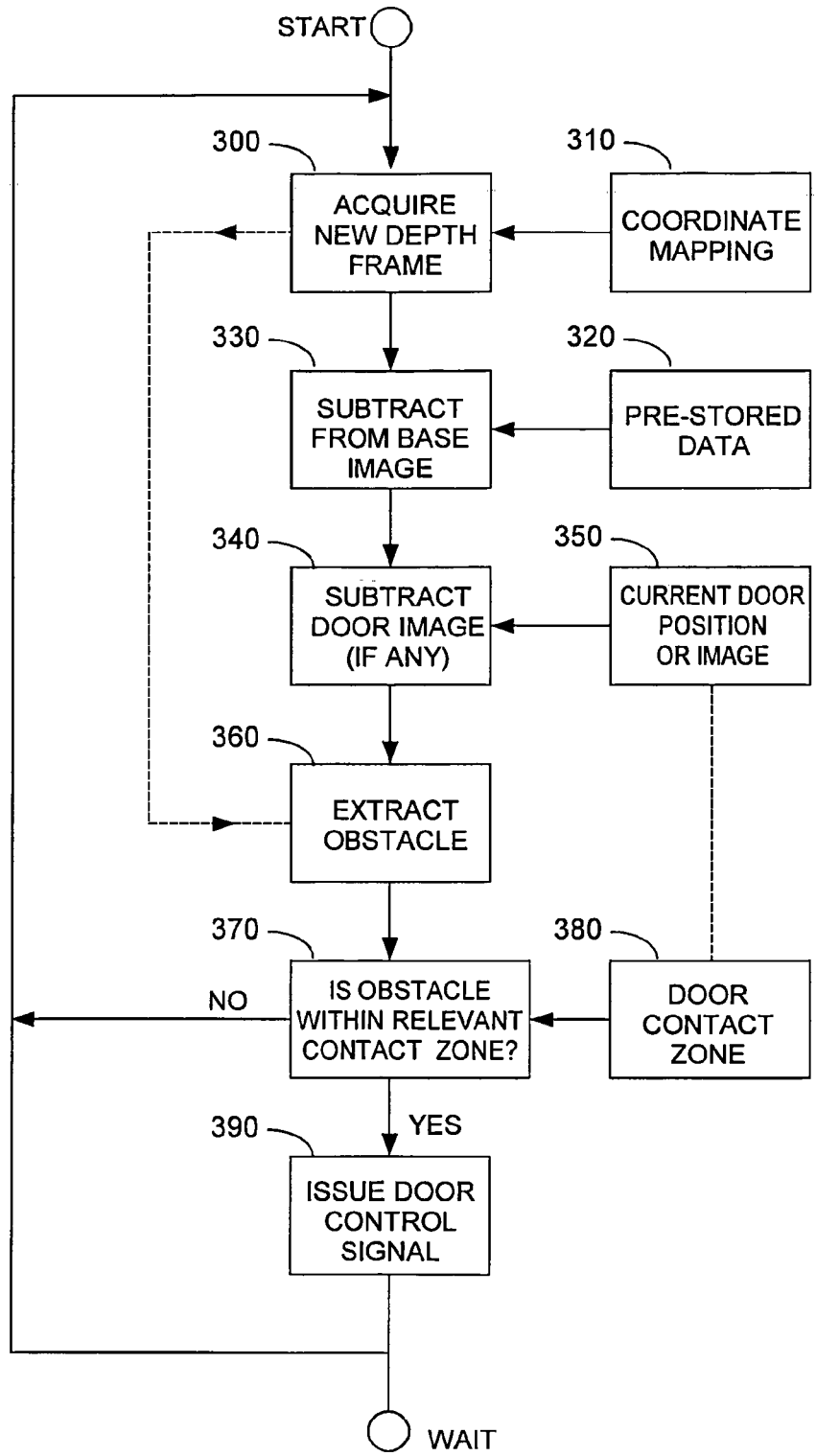
FIG. 5 depicts an exemplary algorithm flow chart to determine presence of an obstacle within a zone of interest, according to an embodiment of the present invention.

However mounted, TOF 200 will provide sensor-acquired depth data to algorithm 210, shown in FIG. 4C, and exemplified by the method steps of FIG. 5. Algorithm 210 then processes the captured imaged data and determines whether the object indeed is within the opening or closing trajectory of the associated door. Since the location of the TOF system is known a priori with respect to the door and associated vehicle door frame, algorithm 210 can readily determine whether the object will be contacted by the opening or closing door, unless a control signal is issued to the associated door moving motor or other mechanism. In this fashion, the present invention prevents object contact and resultant damage without first requiring some initial contact to know that the object is present within the contact zone.

In a motor vehicle application, a typical passenger van has sliding rear side doors and a rear liftgate (or tailgate or hatchback) that pivots upwards to open. In most vans, a sliding door when closed lies in a plane with the side of the vehicle. But when opening, the door is first moved away from the vehicle side and then slides backwards in a second plane that is spaced-apart from the vehicle side. During closing, the door is moved forward in the second plane and upon closing is in the first plane. Structurally, the left and right sides of this vehicle have a B pillar and a C pillar. As indicated in FIG. 4C, the B pillar is the vertical structural pillar found generally behind the front passenger seats on the vehicle sides, and the C pillar is the vertical structural pillar found generally behind the rear passenger seats on the vehicle sides. Applicants experimented with a van vehicle to determine optimum mounting locations for TOF systems 200-4, 200-5, and 200-1 to adequately image relevant contact zones for the rear sliding doors 230-4, 230-5, and the rear liftgate 230-1. With respect to guarding against object contact with the rear side doors, a preferred vehicle frame mounting site for TOF systems 200-4, 200-5 was found to be the top of the door frame by the C pillar facing forward and slightly down, towards the B pillar, as shown in FIG. 4C. Such mounting was found in practice to provide good imaging for the contact zone gap opening between the vehicle door frame near the B pillar and the front portion of the rear sliding doors. Based on these experiments, mounting of TOF systems 200-2, 200-3 near the top of the B pillars facing forward and slightly down would probably suffice to adequately image contact zones associated with sliding left and right doors.

In one embodiment of the present invention, the TOF system preferably is installed in the fixed door frame of the vehicle. In another embodiment, the TOF system preferably is installed on the movable door or movable liftgate and thus is moved as the door or liftgate is being opened or closed.

Consider first a stationary mounting of TOF system 200 on the door frame of vehicle 220, e.g., near the top of the C pillar facing slightly downward towards the B pillar, and the execution of algorithm 210. Such mounting means the relevant FOV can image a scene compassing the associated contact zone as well as a portion of the door itself, it being understood that the relevant contact zone lies within a region of the associated door opening space. As described earlier herein, pixel sensor array 130 acquires and helps produce a complete three-dimensional cloud of (X,Y,Z) coordinate data for all stationary vehicle body objects within the imaged scene. Such data can be obtained and pre-stored in a database in memory, perhaps memory 170, for the contact zone when no object is present. The three-dimensional data cloud acquired by TOF system 200 enables algorithm 210 to compare this pre-stored database image with currently acquired imagery to detect whether an object has intruded into the contact zone. Further, the three-dimensional nature of the data acquired by TOF 200 readily allows measurement data points away from the three-dimensional zone of interest to be ignored rather than processed. Advantageously, determining the presence of an object in the contact zone is carried out without dependence upon the color or shape of an object, and without dependence upon ambient light.

Consider now application of exemplary algorithm 210 to determine whether an object is in the path trajectory (or contact zone) of a closing door. Specifics of the algorithm may vary depending upon whether TOF system 200 is mounted in a stationary position on or in the vehicle, or is mounted on the moving door itself. Referring now to FIG. 5, at step 300 of exemplary algorithm 210, TOF system 200 acquires a frame of Z or depth data encompassing the FOV, which as noted includes the relevant contact zone. Acquisition of data need not occur until the relevant door is opened, for example, as determined by a door position sensor associated with vehicle 220. FIG. 6B is an example of such a depth image.

Optional method step 310 represents conversion, as needed, of three-dimensional depth data (e.g., DATA') acquired by TOF system 200 from TOF system coordinates to real-world door coordinates to real-world coordinates, as the relative position of the TOF system to the door is known. Preferably such coordinate conversion is an optimization that eliminates a need to recognize the door itself at each acquired data frame. Method step 310 is optional but might be invoked when the TOF system is also is used to view objects in real world outside the vehicle. For example, if the TOF system is mounted on the rear of the vehicle, perhaps to image liftgate operation, the TOF system may also be used as a backup sensor to detect obstacles behind the vehicles as it moves rearward. In such case, conversion from TOF system coordinates to real-world coordinates is useful in detecting the ground and obstacles or objects above the ground.

At optional method step 320, algorithm 210 obtains the door-position-dependent background model that has previously been imaged with system 200 and stored in a database in memory 170 (or elsewhere). This base image preferably represents the statistics of Z data acquired by each pixel 140 in array 130, when no object is present in the relevant contact zone. FIG. 6A represents an example of such a pre-stored depth image, acquired in the known absence of any object.

At method step 330, algorithm 210 subtracts the current depth frame data acquired at method step 300 from the previously obtained and stored database image data at method step 320 to form a difference image. Essentially the algorithm compares the pre-stored base image with the currently acquired image to determine pixels whose Z depths are statistically unlikely to represent scene background.

At method step 340, the algorithm preferably compares the currently known image of the door itself with the difference image to determine pixels in array 130 whose acquired Z depths are statistically unlikely to represent the door image itself, or background imagery. In method step 340, the notation "if any" represents a placeholder in the algorithm flow diagram if image data has previously been saved to memory. If the difference image does not include the door, then step 340 may be omitted.

At method step 350, the current door position is stored into memory, e.g., memory 170. The current position of the door may be obtained from a door sensor associated with vehicle 220. Alternatively, the current door position may be determined by TOF system 200 and algorithm 210, e.g., using match filtering, or the like to select a pre-stored background model that is most similar to the currently acquired depth image.

At method step 360, pixels in array 130 statistically likely to have come from obstacle(s) are determined. In practice, such pixels may be clustered over time and space and can be used to detect objects, large or small, bright or dim, even in the presence of signal noise.

At method step 380, the relevant door contact zone will have been determined a priori and stored in memory, e.g., memory 170. If desired, this contact zone can include the three-dimensional volume occupied by the relevant door at all possible door locations, between fully closed and fully open. At method steps 370, the algorithm determines whether obstacles determined to be present at step 360 are found within the contact zone associated with the relevant door. This determination preferably is made by comparing the three dimensional contact zone associated with the door, with the three-dimensional image of obstacles determined at step 360.

At method step 390, if any part of an obstacle is determined to fall within the relevant door contact zone, a control signal is generated. The control signal preferably is coupled to the vehicle door closing/opening mechanism, e.g., motor 240 and associated logic, to halt or reverse door motion. If desired, the control signal could also initiate an audible alarm, perhaps the vehicle horn. If the object is a human, he or she could then instantly attempt to move out of harm's way, even through the motion of the door was being halted or reversed.

On the other hand, if method step 370 determines that the obstacle extracted at step 360 is outside the relevant contact zone, algorithm 210 reverts to step 300, and continues to monitor the opened door.

It will be appreciated that implementing a TOF contactless system using a software-based algorithm 210 advantageously permits updating the routine as models and changes in method steps are desired.

FIG. 6A is a gray scale Z depth image acquired by TOF system 200A showing the contact zone associated with opening and closing of the left rear door 230-4 of vehicle 220. The image shown in FIG. 6A preferably is obtained with no object present and is stored in a database, e.g., memory 170, for use by algorithm 210. As indicated in FIG. 5, algorithm 210 can use this image data at method step 320 in determining when an object intrudes into this contact zone. FIG. 6B is a gray scale depth image acquired by the same TOF system 200A showing the same region of the contact zone, but showing a cluster of depth values (indicated by color or gray scale) that differ substantially from the same region in FIG. 6A. The region of this cluster is shown within a phantom line circle in FIG. 6B. The depth image data of FIG. 6B may exemplify data acquired during step 300 in FIG. 5.

FIG. 6C is an intensity image of a portion of the contact zone adjacent the interior door handle of the relevant door. Common to a great deal of intensity acquired data, the presence or absence of an intruding object is not readily apparent.

By contrast, FIG. 6D is a gray scale Z depth image of the same portion of the contact zone, and appears to show a finger-shaped object intruding near the upper third of the interior door handle. FIG. 6E represents a cross-section of Z depth data acquired from a single row of pixel detectors 140 in sensor array 130, and clearly shows a depth anomaly consistent with an object intruding into the monitored space. Stated differently, the anomaly is consistent with a sudden discontinuity in Z depth values in the space adjacent the upper third of the interior door handle. The depth anomaly in FIG. 6E coincides with the gray scale change in FIG. 6D. Note however, that reliance solely upon the intensity acquired image of FIG. 6C would not lead to a reliable determination of whether an object was intruding, especially if the color or reflectivity of the object happened to match that of the background imagery. The point is, however, that one can specify a TOF system with resolution adequate to detect an object as small as a human finger.

Consider now an embodiment of the present invention in which TOF system 200 is mounted on the vehicle door rather than being stationarily mounted to the vehicle door frame. When TOF system 200 is mounted on a movable door, the FOV encompasses a dynamic contact zone about the vicinity of the interior or exterior of the door. Understandably, the detection zone moves as the door moves and preferably, the dimensions of the detection zone alter dynamically with door position. If desired, object contact with a door can be prevented by monitoring the relevant contact zone(s) using a combination of TOF systems, e.g., one system affixed to the vehicle door frame, perhaps one TOF system affixed to the interior of the door directed towards the contact zone, and yet another TOF system affixed to the exterior of the door directed towards the contact zone.

FIGS. 7A and 7B depict tailgate 230-1 closing towards the door frame of vehicle 220. In this embodiment, a first TOF system 200-1U is mounted on the upper surface of the tailgate, and a second TOF system 200-1L is mounted on the lower surface of the tailgate. Each TOF system preferably is mounted near the upper pivot region of the tailgate so as to better image respective upper and lower regions of contact zone 250-1. Note that mounting the TOF system(s) to the moving door will enable a smaller FOV to still encompass a sufficient contact zone, because the contact zone moves dynamically with the door. As a practical matter, there will generally be a tradeoff between TOF system cost and object detection performance.

Algorithm 210 works similarly to what has been described with respect to FIG. 5 and stationary mounting of TOF systems, although details of steps 210 function differently, depending upon whether the TOF system is used for opening or closing of a liftgate.

When the TOF system is used during liftgate opening, the pre-stored data does not necessarily need to be an image (see FIG. 5, step 320). Instead, the data may be a three-dimensional boundary in the TOF system FOV that must be clear of avoidable objects for the door to operate. It is insufficient to merely determine whether the leading boundary of the contact zone intercepts an obstacle or object as the liftgate opens because an object may suddenly intrude into another portion of the contact zone. For example, an obstacle may suddenly intrude into the middle of the detection zone. Further, in this case it is not necessary to subtract from a base image as in step 330 or step 340.

It is also useful to pre-define a part of the FOV that the TOF system should ignore. For instance, when the TOF system is mounted on the liftgate (see FIGS. 7A and 7B), the liftgate itself maybe visible to the TOF system and thus be imaged. However, algorithm 210 in the TOF system should ignore this image and not identify it as an obstacle to be avoided. One might define in the image plane a mask that is a segment of detector pixels whose depth data should be ignored by the algorithm. The boundaries of the mask can be obtained by a process of calibration or with knowledge of the position of the TOF system relative to its mounting fixture. Preferably during a calibration process, a base image is acquired of the door after the TOF system is installed. This acquired image preferably will define the pre-stored mask (e.g., in a database perhaps in memory 170) within the image that should be ignored.

When using the TOF system during liftgate closing rather than opening, a similar method as described may be used. However, when the liftgate approaches the end of its closing trajectory, certain objects that do not constitute an obstacle may become visible to the TOF system. For instance, the vehicle bumper may become visible and thus imaged. However, the algorithm in step 370 in FIG. 5 should ignore the bumper as it is outside the boundary of the defined contact zone. Further, as the liftgate nears the end of its closing trajectory, any cargo stored inside the rear of the vehicle may become visible and imaged within the detection zone. However, the algorithm at step 370 in FIG. 5 should ignore any imaged cargo, based upon liftgate position information available from the liftgate electro-mechanics. Thus, while the tailgate was at say a 45° angle from closed position, the bottom depth of the contact zone would be greater than when the tailgate is with a few degrees of closing because the tailgate will abut the vehicle door frame before cargo could physically be contacted. If this information is not available from the liftgate electro-mechanics, in some embodiments, the TOF system can determine liftgate position using visual clues acquired from images of the vehicle door frame.

The remaining steps carried out by algorithm 210 are as described with respect to FIG. 5. Similarly to what has been described, detection of an object within the contact zone will result in issuance of a control signal causing tailgate moving mechanism 240-1 to retard, to halt, or to reverse liftgate motion.

FIGS. 8A and 8B depict, respectively, a gray scale depth image and a brightness image acquired from a stationary vehicle-mounted TOF system, e.g., 200-1 in FIG. 4C. Note that an object, a human with arms upraised, imaged, although not necessarily within the relevant contact zone. FIGS. 8C and 8D again depict respective gray scale depth and brightness images, but where the liftgate has continued to close towards the human object, which now appears larger and is presently within the relevant contact zone. Accordingly, the TOF system will generate a control signal to liftgate moving mechanism 240-1 to retard, to halt, or to reverse motion of the liftgate before it contact the human object. Of course a TOF system could of course be mounted to the inside and/or outside of a sliding door, rather than a liftgate.

Figure 8E:
FIG. 8E is a gray scale depth image acquired by a stationary vehicle-mounted TOF system depicting a V-shaped segment as a sliding side door begins to close, and depicts a portion of the vehicle to the right of the V-shaped segment, according to an embodiment of the present invention.
Figure 8F:
FIG. 8F is a gray scale depth image acquired by the stationary vehicle-mounted TOF system of FIG. 8E, depicting a narrowing of the V-shaped segment as the sliding side door continues to close, and depicting an object in the bottom portion of the image, according to an embodiment of the present invention.
Figure 8G:
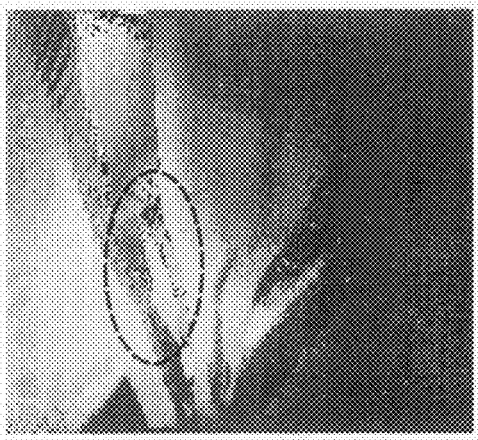
FIG. 8G is a gray scale depth image acquired by the stationary vehicle-mounted TOF system of FIG. 8E, depicting a further narrowing of the V-shaped segment as the sliding side door continues to close, and depicting a hand-shaped object obstructing closure of the door at the bottom portion of the image, according to an embodiment of the present invention.

FIGS. 8E-8G are gray scale depth images acquired by a stationary vehicle-mounted TOF system disposed at the upper B pillar region but directed rearward to image the contact zone associated with a rear sliding door, e.g., 230-4 or 230-5 in FIG. 4A. (In FIGS. 4A and 4C, this would be equivalent to reversing the orientation of TOF systems 200-2, 200-3 to look rearward and down, rather than forward and down.) As the side door begins to close, the gap space between the front of the door and the vehicle door frame will decrease. FIGS. 8E-8G depict the increasingly narrow V-shaped segment or gap as the door closes. A portion of the vehicle body is imaged by the TOF system, and appears on the right side of the V-shaped segment. At the lower region of FIG. 8F, an object appears in the scene, a hand perhaps. In FIG. 8G, the V-section has continued to narrow and a hand-shaped object appears in the contact zone within the V-section (see encircled region of FIG. 8G). As previously described, as soon as algorithm 210 determines that the object, here a hand, lies within the relevant contact zone, a control signal will issue, causing the door moving mechanism to retard, to halt, or to reverse direction, and optionally to cause an audible warning to issue. Again, there is a cost-performance tradeoff associated with the performance of the TOF system. A system that can identify a finger-sized object will have higher performance specifications and will cost more than a system designed to identify arm-sized objects.

To recapitulate, embodiments of the present invention can image contact zones associated with motor vehicle doors, or indeed powered doors associated with buildings, elevators, etc., and gates. The present invention utilizes TOF systems that can be mounted on the interior or exterior of the motor vehicle body, and/or on the interior or exterior surface of a moving door, typically depending upon the design specifications of the vehicle manufacturer. The TOF systems not only image objects, but use the three-dimensional depth image data to rapidly determine whether an object is within the three-dimensional contact zone associated with a vehicle door. By contrast, a prior art sensing system that might try to utilize conventional cameras could image objects (assuming adequate ambient light, and adequate contrast between the object and background), but would lack a mechanism to know whether the object is within a contact zone. Further, sliding side doors on motor vehicles slide or move in a first plane, slightly spaced apart from the vehicle side, and to close, move into a second plane in line with the vehicle door frame. As such, conventional approaches to imaging cannot reliably image objects in the first plane, let alone determine whether such objects are indeed in potential of being struck by the moving door.

In many motor vehicles, certain pinch prone areas may be somewhat protected by the use of soft plastic in the door frame and/or closing edge of the door. But other areas will present metal-to-metal pinch hazards. According to embodiments of the present invention, contactless object or pinch monitoring can be implemented by disposing a TOF system above the pinch contact zone of the door. Even if the TOF system does not have complete visibility of the contact zone in the final stage of door closing, e.g., as door latching is to commence, as soon as a hand or finger-shaped object is discerned by algorithm 210, door movement can be caused to halt or reverse. In such applications, algorithm 210 could include anticipatory functions to detect a potential pinch situation, even where visibility of the latch area is not available. For example, as a door is being closed, DATA acquired by a high frame rate TOF system can determine velocity of an image object approaching the door. Since algorithm 210 has sufficient data to determine velocity of the closing door, the algorithm can readily predict whether the apparent object will be contacted within the closing door trajectory. If contact is predicted, the algorithm can issue a control signal to halt or reverse door movement.

While one could retrofit a TOF system or systems into a vehicle to provide contactless protection against object-door contact, it is anticipated that motor vehicle manufacturers will incorporate such TOF systems within or on the vehicle and/or doors, during time of manufacturer. Doors having less ability to inflict serious harm if contacting an object could be imaged with a TOF system having lesser performance specifications than a door that could inflict more serious harm. In any event, the TOF systems described herein have been found to provide adequate protection against object-door contact, without requiring contact to first occur, as with prior art contact-type systems. Further, the present invention functions under a wide range of ambient conditions, and indeed can operate without any ambient light, e.g., in total darkness. In addition, embodiments of the present invention may be mounted in the interior or on the exterior of a motor vehicle, and/or on the inside or the outside of a movable door.

Further, because the present invention preferably utilizes a software algorithm, aspects of object imaging and location identification can occur dynamically. Thus, if the door in question is a heavy vehicle side door that is sliding with high velocity (thus having large inertia), the normal volume of the contact zone might be dynamically expanded (in software) such that an object-in-the-contact zone control signal issues sooner. Such flexibility might be very useful if, for example, the vehicle were parked facing downhill, and gravity caused the forward closing motion of a sliding side door to increase beyond nominal value. Door velocity could be determined by the TOF system or by a mechanical sensor associated with the door.

Other embodiments of the present invention could include software modification to algorithm 210 to implement gesture recognition. For example when a door is open, the relevant TOF system could detect a person's hand within the FOV gesturing to command the door to be closed. Alternatively, if the door is closed, the relevant TOF system could (if turned on) detect a person's hand within the FOV gesturing to command the door to be opened. Further, TOF imaging within the vehicle could determine whether a child was perhaps playing with the door lock. Algorithm 210 could be modified to include recognizing such interaction, and to issue a warning to the vehicle operator to perhaps deactivate passenger control over the associated door lock.

While embodiments of the present invention have been described with regard to deploying TOF systems to protect contact zones against unwanted object contact with the vehicle frame and moving vehicle doors, other applications are also possible. For example, if relevant TOF system are activated during vehicle operation, the nature and location of objects on the vehicle seats could be determined, e.g., adult passenger, child passenger, cargo, etc. This information could be used to intelligently deploy, including suppressing deployment, airbags. For example, assume the TOF system determines that a small child is in a passenger seat leaning towards a side airbag location when a side impact occurs. Under these circumstances, full strength side airbag deploy might injury the child and the TOF system could be used to command weak or no side airbag deployment. Another embodiment would to employ a rearward-facing TOF system to image and identify the nature and location of potentially hazardous objects, including pedestrians and other vehicles, in the trajectory of a vehicle's rearward motion. Similarly side-facing or forward-facing TOF systems could assist a motor vehicle operator in detecting pedestrians or other objects, including vehicles, in a field of interest.

It will be appreciated that embodiments of the present invention may be used to image contact zones without contact in environments including without limitation motorized doors on elevators, motorized doors and gates associated with buildings and real property.

Modifications and variations may be made to the disclosed embodiments without departing from the subject and spirit of the present invention as defined by the following claims.

What is claimed is:

1. A method to contactlessly determine whether a movable door in a motor vehicle is at risk of contacting an avoidable object during door movement, the method comprising the following steps:
    (a) for each said door, disposing at least one time-of-flight (TOF) system with a field of view (FOV) adequately wide to acquire in real-time at least one depth image of at least a portion of a three-dimensional contact zone within which an avoidable object, if present, would be contacted by at least part of said door when said door is moving, an avoidable object being an object excluding said door and a vehicle door frame associate with said door;
    (b) providing said TOF system with a software executable algorithm that uses said depth image acquired at step (a) to determine whether at least a portion of an avoidable object is present within a portion of said contact zone when said door is moving such that door-avoidable object contact may occur unless prevented, said algorithm able to dynamically alter dimensions of said contact zone as a function of at least one door parameter; and
    (c) generating a control signal if step (b) determines presence of said avoidable object within a portion of said contact zone, said control signal coupleable to a mechanism to facilitate at least one of (i) retarding present motion of said door, (ii) reversing direction of present motion of said door, and (iii) halting motion of said door;
    whereby likelihood of damage resulting from contact between said avoidable object and said door is reduced, while ignoring other objects within said FOV.

2. The method of claim 1, wherein step (a) includes mounting said TOF system at a location selected from a group consisting of (i) on an interior portion of said motor vehicle, and (ii) on an exterior portion of said motor vehicle.

3. The method of claim 1, wherein step (a) includes mounting said TOF system at a location selected from a group consisting of (i) on an interior surface of said movable door, and (ii) on an exterior surface of said movable door.

4. The method of claim 1, wherein:
    said TOF system includes a memory storing a previously acquired depth image of said contact zone absent any object therein; and
    step (b) includes comparing said previously acquired depth image with said depth image acquired at step (a).

5. The method of claim 1, wherein:
    said TOF system includes a memory storing previously acquired depth images of said contact zone absent any object therein, said depth images acquired at different permissible locations of said movable door as it moves through three-dimensional space.

6. The method of claim 1, wherein step (b) includes dynamically altering dimensions of said contact zone as a function of present door position.

7. The method of claim 1, wherein step (c) further includes coupling said control signal to a horn of said motor vehicle so as to sound an audible alarm.

8. The method of claim 1, wherein said movable door is selected from a group consisting of (i) a sliding side door, and (ii) a pivotable tailgate.

9. A system to contactlessly determine whether a movable door in a motor vehicle is at risk of contacting an avoidable object during door movement, the system comprising:
    at least one time-of-flight (TOF) system with a field of view (FOV) adequately wide to acquire in real-time at least one depth image of at least a portion of a three-dimensional contact zone within which an avoidable object, if present, would be contacted by at least part of said door when said door is moving, an avoidable object being excluding said door and a vehicle door frame associated with said door, said TOF system disposed on said motor vehicle so as to obtain said at least one depth image;
    a processor;
    memory, executable by said processor, storing at least a software executable algorithm that uses said acquired depth image to determine whether at least a portion of an avoidable object is present within a portion of said contact zone when said door is moving such that door-avoidable object contact may occur unless prevented, said algorithm able to dynamically alter dimensions of said contact zone as a function of at least one door parameter; and
    said algorithm generating a control signal if said algorithm determines presence of at least a portion of said avoidable object within a portion of said contact zone, said control signal coupleable to a mechanism to facilitate at least one of (i) retarding present motion of said door, (ii) reversing direction of present motion of said door, and (iii) halting motion of said door;
    whereby likelihood of damage resulting from contact between said avoidable object and said door is reduced.

10. The system of claim 9, wherein said TOF system is mounted at a location selected from a group consisting of (i) on an interior portion of said motor vehicle, and (ii) on an exterior portion of said motor vehicle.

11. The system of claim 9, wherein said TOF system is mounted at a location selected from a group consisting of (i) on an interior surface of said movable door, and (ii) on an exterior surface of said movable door.

12. The system of claim 9, wherein:
    said memory stores a previously acquired depth image of said three-dimensional space absent any object therein; and
    said algorithm compares said previously acquired depth image with said depth image acquired by said TOF system.

13. The system of claim 9, wherein:
    said memory stores previously acquired depth images of said contact zone absent any object therein, said depth images acquired at different permissible locations of said movable door as it moves through three-dimensional space.

14. The system of claim 9, wherein said algorithm dynamically alters volume of said contact zone as a function of at least one dynamic parameter of f said moving door.

15. The system of claim 9, wherein said algorithm dynamically alters dimensions of said contact zone as a function of present door position.

16. The system of claim 9, wherein said control signal is coupled to a horn of said motor vehicle so as to sound an audible alarm.

17. The system of claim 9, wherein said movable door is selected from a group consisting of (i) a sliding side door, and (ii) a pivotable tailgate.

18. A system to contactlessly determine whether a movable door in a motor vehicle is at risk of contacting an avoidable object during door movement, the system comprising:
    at least one time-of-flight (TOF) system with a field of view (FOV) adequately wide to acquire in real-time at least one depth image of at least a portion of a three-dimensional contact zone within which an avoidable object, if present, would be contacted by at least part of said door when said door is moving, an avoidable object being an object excluding said door and a vehicle door frame associated with said door, said TOF system disposed on said motor vehicle so as to obtain said at least one depth image on a location selected from a group consisting of (i) an interior portion of said motor vehicle, (ii) an exterior portion of said motor vehicle, (iii) an interior portion of a sliding door of said motor vehicle, (iv) an exterior portion of a sliding door of said motor vehicle, (v) an interior portion of a pivotable tailgate of said motor vehicle, and (vi) an exterior portion of a pivotable tailgate of said motor vehicle;

a processor;

memory, executable by said processor, storing at least a software executable algorithm that uses said acquired depth image to determine whether at least a portion of an avoidable object is present within a portion of said contact zone when said door is moving such that door-avoidable object contact may occur unless prevented, said algorithm able to dynamically alter dimensions of said contact zone as a function of at least one door parameter; and to generate a control signal if said algorithm determines presence of at least a portion of said avoidable object within a portion of said contact zone, said control signal coupleable to a mechanism to facilitate at least one of (i) retarding present motion of said door, (ii) reversing direction of present motion of said door, and (iii) halting motion of said door;

whereby likelihood of damage resulting from contact between said avoidable object and said door is reduced.

19. The system of claim 18, wherein:

said memory stores at least one of (i) a previously acquired depth image of said contact zone absent any object therein, and (ii) ; and previously acquire depth images of said contact zone absent any object therein, said depth images acquired at different permissible locations of said movable door as it moves through three-dimensional space; and said algorithm compares said previously acquired depth image with said depth image acquired by said TOF system.

* * * * *